Oct. 9, 1962    W. D. HANNIGAN    3,057,298
FLEXURAL SUPPORT FOR ROCKET
Filed June 17, 1959    2 Sheets-Sheet 1

INVENTOR
WILLIAM D. HANNIGAN
BY Charles A Warren
ATTORNEY

Oct. 9, 1962 W. D. HANNIGAN 3,057,298
FLEXURAL SUPPORT FOR ROCKET
Filed June 17, 1959 2 Sheets-Sheet 2
FIG_3
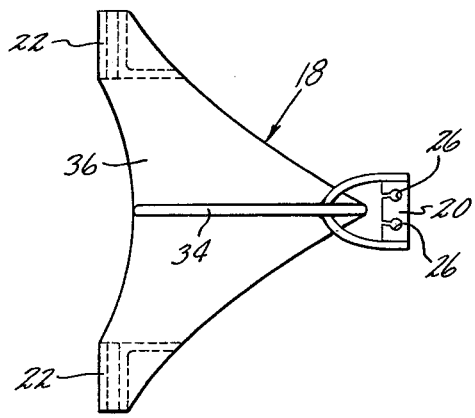
FIG_4
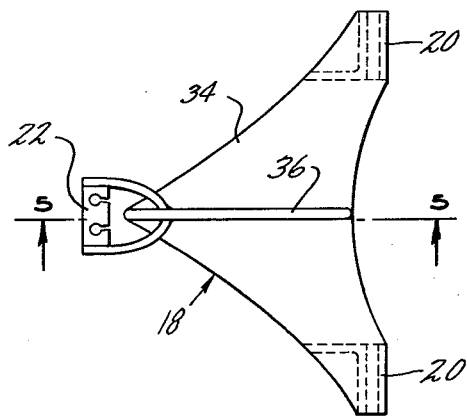
FIG_6
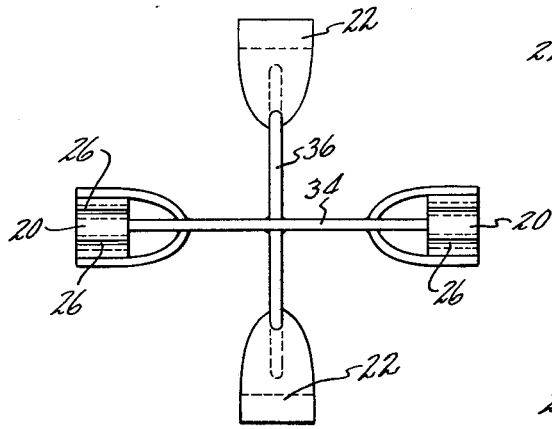
FIG_5
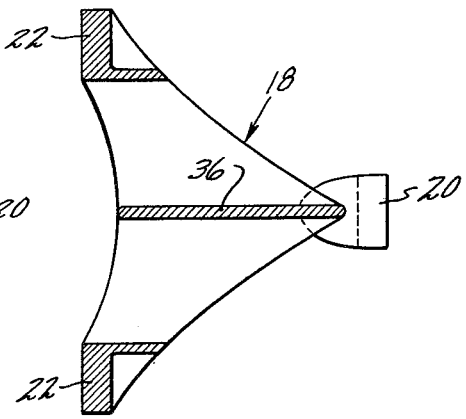
FIG_7
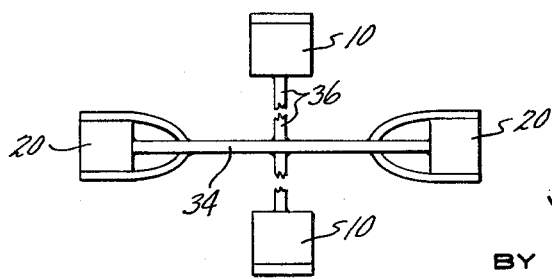
INVENTOR
WILLIAM D. HANNIGAN
BY Charles A. Warren
ATTORNEY 3,057,298
FLEXURAL SUPPORT FOR ROCKET
William D. Hannigan, Wethersfield, Conn., assignor to United Aircraft Corporation, East Hartford, Conn., a corporation of Delaware
Filed June 17, 1959, Ser. No. 820,901
10 Claims. (Cl. 102—50)

This invention relates to a flexible supporting structure particularly adapted for connecting a rocket nozzle or rocket motor to a vehicle.

Many missiles or space vehicles require vectoring control in order to change the direction of flight and this is often accomplished by changing the line of thrust of the nozzle with respect to the vehicle. Gimbals have been used to permit the angular movement of the nozzle required for this vectoring. A feature of this invention is the replacement of the gimbals by a flexural support which will minimize friction loading. Another feature is a support in which the flexure members are loaded in tension. Another feature is a support capable of resisting torque loads that may be applied during operation.

One feature is a flexural support having attachment means by which the rocket engine may be radially attached to a vehicle, the flexural support incorporating with it the mounting structure. Another feature is the self alignment characteristic, the flexures act as semi-elliptical springs which store energy used to deflect them. As soon as the deflecting force is removed the energy is available to assist the vectoring mechanism to return the engine to its axis.

Other features and advantages will be apparent from the specification and claims, and from the accompanying drawings which illustrate an embodiment of the invention.

Figure 1:
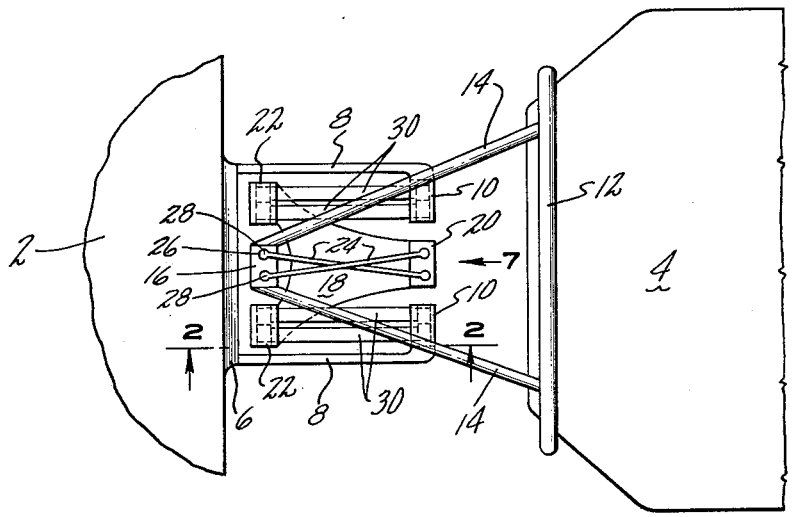
Figure 2:
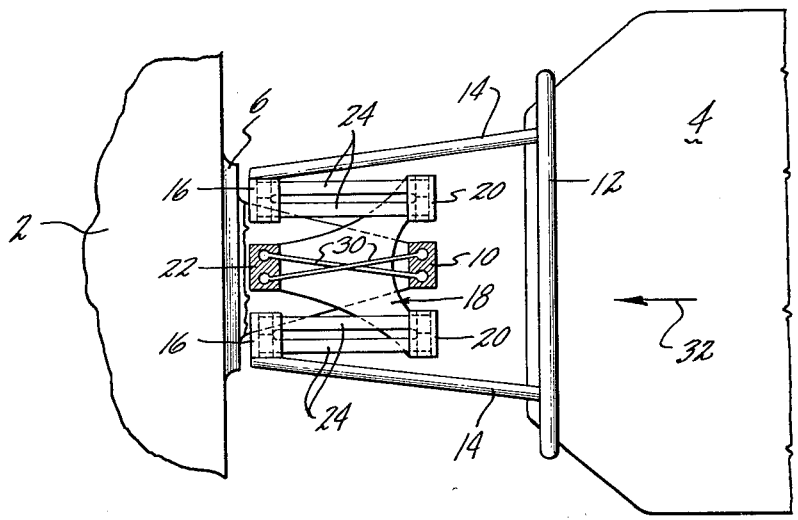

FIG. 1 is a side elevation of the device.
FIG. 2 is a view similar to FIG. 1 but viewed at a position at right angles to FIG. 1.
FIG. 3 is an elevation of the intermediate support.
FIG. 4 is a view taken at right angles to FIG. 3.
FIG. 5 is a sectional view substantially along line 5—5 of FIG. 4.
FIG. 6 is an end view of the intermediate support.
FIG. 7 is a diagrammatic end view of the device looking in the direction of the arrow 7 of FIG. 1.

The invention is shown as a device for connecting a missile or vehicle 2 to a rocket engine 4. The device includes a base 6 adapted for attachment to the vehicle 2, this base having thereon spaced parallel supports 8 on the ends of which are spaced mounting blocks 10. These mounting blocks are diametrical sides of the longitudinal axis of the device and are in alignment with each other, as shown.

The rocket engine 4 has attached thereto a mounting or attachment means 12 in the form of a ring which is suitably connected to the engine. Projecting from this ring are support rods 14 approximately uniformally spaced apart at their connection with the ring. The rods are arranged in pairs and each pair supports a mounting block 16. There are thus two mounting blocks 16 arranged diametrically across from one another with respect to the longitudinal axis of the device. These mounting blocks 16 are displaced angularly 90° from the mounting blocks 10 and also axially spaced from mounting blocks 10 in a direction toward the base 6.

Forming a part of the interconnecting structure between the mounting blocks 10 and the mounting blocks 16 is an intermediate member 18 which supports a pair of diametrically opposed mounting blocks 20 which are located substantially in the same transverse plane as the mounting blocks 10 and located angularly at right angles to the mounting blocks 10.

This same intermediate member 18 carries in axially spaced relation to the mounting blocks 20 a pair of mounting blocks 22 which are substantially in the same transverse plane as the blocks 16 and which are angularly spaced from the blocks 16 to be at right angles to the blocks 16. With this arrangement, when the device is viewed as in FIGS. 1 and 2, the blocks 16 and 20 are in axial alignment with each other and the blocks 10 and 22 are also in axial alignment with each other.

Each block 16, as best shown in FIG. 1, is connected to the associated block 20 in alignment therewith by a flexure tension element which consists of a pair of tension straps 24 extending generally in an axial direction. The straps of the pair extend at a small acute angle with respect to each other and the opposite ends of the straps are securely held within the blocks 16 and 20. One mounting for these straps may be in the form of radially extending slots 26 which receive the headed ends 28 of the tension straps 24. Accordingly, the connection between the blocks 16 on the attachment structure for the rocket engine are connected to the intermediate member 18 by the diametrically opposed flexible tension elements, each consisting of the two crossed tension straps 24. This arrangement is best shown in FIG. 2 which, as above stated, is a view at right angles to the showing of FIG. 1.

In a similar manner, the mounting blocks 10 on the missile or vehicle attachment means 6 are connected to the mounting blocks 22 on the intermediate member 18 by diametrically opposed flexible tension elements, each of which is made up of a pair of tension straps 30 arranged in a generally axial direction but with the straps of the pair extending at an acute angle to one another, as best shown in FIG. 2. The ends of the straps 30 may be mounted to the blocks as in much the same way as the straps 24.

With a flexible connecting means as above described, it will be apparent that with the thrust provided by the rocket engine acting in the direction of the arrow 32, the thrust load will be transmitted from the attachment means made up of the ring 12 and rods 14 to the base 6 through tension applied to the tension elements since these constitute the wall connecting structure from one attachment means through the intermediate element to the other. The flexible elements permit the rocket engine to be vectored about the longitudinal axis to a limited degree in any direction and by having the several tension elements each consisting of a pair of crossed straps, the rocket engine will return to aligned relation as soon as the vectoring force is removed. Furthermore, with the crossed straps arranged in this manner any torque loads developing between the rocket engine and the vehicle will be transmitted by the straps without misalignment of the members.

The intermediate element may be of any suitable configuration to accommodate the loads to permit the functioning of the flexure elements. One particular configuration of the intermediate member is shown in FIGS. 3 and 5. The function of this element is to provide a rigid connection between the pairs of tension straps 24 from the rocket motor and the pairs of tension straps 30 from the vehicle. As shown in these figures, the element 18 is in the form of a cross made up of one web 34 supporting the blocks 20 and a crossing web 36 at right angles supporting the blocks 22. The particular configuration of this device is critical only in that it be rigid and capable of carrying the loads applied thereto.

The angular spacing of the blocks 20 with respect to the blocks 10 is shown in FIG. 7 in which the web 36 is broken away to make this showing clearer. Essentially the blocks 20 are in one longitudinal plane, and the blocks 10 are in a longitudinal plane at right angles to the plane of blocks 20.

I claim:

1. A flexible connection between a rocket engine and a vehicle, including attachment means on said engine extending toward said vehicle, attachment means on said vehicle extending toward said engine and axially overlapping said engine attachment means, an intermediate supporting member substantially coextensive axially with the overlapping attachment means, flexible tension elements extending from the engine attachment means to the intermediate element, said tension elements being substantially axially positioned and engaging at one end with the engine attachment remote from the engine and at the other end with the part of the intermediate element adjacent to the engine, and other flexible tension elements extending from the vehicle attachment means to the intermediate element, said other tension elements engaging at one end with the vehicle attachment means remote from the vehicle and at the other end with the part of the intermediate element adjacent to the vehicle.

2. A flexible connection as in claim 1 in which each tension element is a pair of tension straps extending in a generally axial direction and at an acute angle to each other.

3. A flexible connection between a rocket engine and a vehicle including an engine connection extending from said engine toward said vehicle, and a vehicle connection extending from said vehicle toward said engine, said connections overlapping, said vehicle connection having attachment means at the end remote from the vehicle and said engine connection having attachment means on the end remote from the engine, and interconnecting means between the attachment means on said connections, said interconnecting means including, at least in part, flexible tension elements constituting the load carrying elements between the engine and vehicle.

4. A flexible connection as in claim 3 in which each tension element consists of a pair of crossed tension straps with adjacent ends of the straps of a pair secured in spaced relation to each other.

5. A flexible connection between a rocket engine and a vehicle including an engine connection extending from said engine toward said vehicle, and a vehicle connection extending from said vehicle toward said engine, said connections overlapping, said vehicle connection having attachment means at the end remote from the vehicle and said engine connection having attachment means on the end remote from the engine, and interconnecting means between the attachment means on said connections, said interconnecting means including an intermediate element having attachment means at opposite ends located adjacent the vehicle attachment means and the engine attachment means respectively and flexible tension elements between the engine attachment means and one of the attachment means on the intermediate element and other flexible tension elements between the vehicle attachment means and the other attachment means on the intermediate element.

6. A connection as in claim 5 in which each tension element consists of a pair of crossed tension straps with adjacent ends of the straps of a pair secured in spaced relation to each other.

7. A flexible connection between a rocket engine and a vehicle including a vehicle connection extending toward the engine and an engine connection extending toward the vehicle, said connections overlapping said engine connection having attachment means at the end adjacent the vehicle and said vehicle connection having attachment means at the end adjacent the engine, an intermediate support member having sets of spaced attachment means, said support member extending between the attachment means on said engine and vehicle connections, flexible tension elements extending from said attachment means on the vehicle connection to one set of attachment means on the intermediate member and other flexible tension members extending from the attachment means on the engine connection to the other set of attachment means on the intermediate member.

8. A connection as in claim 7 wherein each flexible tension element consists of a pair of tension straps extending in a generally axial direction and at an acute angle to each other.

9. A flexible connection as in claim 7 in which said engine and vehicle connections and said intermediate member have a common axis, and in which said one set of attachment means on the member is in substantially axial alignment with the attachment means on the vehicle member and said other set is in axial alignment with the attachment means on the engine member.

10. A flexible connection as in claim 9 in which the set of flexible elements from the vehicle connection to the intermediate member is positioned in angularly spaced relation to the other set of flexible tension elements substantially at 90° to each other.

References Cited in the file of this patent

UNITED STATES PATENTS

| | | |
|---|---|---|
| 2,621,871 | Robert | Dec. 16, 1952 |
| 2,828,607 | Johnson | Apr. 1, 1958 |

OTHER REFERENCES

"Complication For Solids: Thrust-Direction Control" (Baker), published in the Feb. 9, 1959 issue of "Missiles & Rockets," p. 23 relied on. (Copy in Scientific Library or Div. 10.)